United States Patent
Oberholtzer et al.

(10) Patent No.: US 11,049,085 B2
(45) Date of Patent: Jun. 29, 2021

(54) POINT OF SALE CLIENT INTEGRATION PLATFORM

(71) Applicant: FreedomPay, Inc., Philadelphia, PA (US)

(72) Inventors: Stephen M. Oberholtzer, King of Prussia, PA (US); David O. Knowlton, Wilmington, DE (US); Christopher R. Kronenthal, Gladwyne, PA (US); John T. Styslinger, Phoenixville, PA (US)

(73) Assignee: FREEDOMPAY, INC., Philadelphia, PA (US)

( * ) Notice: Subject to any disclaimer, the term of this patent is extended or adjusted under 35 U.S.C. 154(b) by 138 days.

(21) Appl. No.: 16/267,926

(22) Filed: Feb. 5, 2019

(65) Prior Publication Data
US 2020/0250644 A1 Aug. 6, 2020

(51) Int. Cl.
G06Q 20/20 (2012.01)
G06Q 20/40 (2012.01)

(52) U.S. Cl.
CPC ........ G06Q 20/202 (2013.01); G06Q 20/40 (2013.01)

(58) Field of Classification Search
CPC .. G06Q 20/40; G06Q 20/202; G06Q 20/3278; H04L 67/10
USPC ........................................ 705/21
See application file for complete search history.

(56) References Cited

U.S. PATENT DOCUMENTS 7,587,196 B2   9/2009  Hansen
7,599,857 B2  10/2009  Bishop et al.
7,961,851 B2 *  6/2011  Bran ............... H04M 1/7243
                                              379/88.14
8,109,444 B2   2/2012  Jain
8,429,046 B2   4/2013  Pitroda
(Continued)

FOREIGN PATENT DOCUMENTS

WO   2002013120 A1   2/2002
WO   2002027629 A1   4/2002

OTHER PUBLICATIONS

Chow et al., Authentication in the Clouds: A Framework and its Application to Mobile Users, CCSW'10, Oct. 8, 2010, Chicago, Illinois, USA, 6 pages.
(Continued)

*Primary Examiner* — Andrew Joseph Rudy
(74) *Attorney, Agent, or Firm* — Cantor Colburn LLP

(57) ABSTRACT

A point of sale client integration platform is provided. The point of sale client integration platform includes a point of sale client application and a commerce client module that, in combination, provide a device agnostic payment transaction operation. The commerce client module includes communication interfaces, each of which corresponds to a particular communication protocol. The commerce client module receives a payment request from the point of sale client application and directly communicates, via one of the communication protocols, an authorization and capture request with respect to the payment request to a payment gateway. Through the same communication protocol, the commerce client module receives an authorization and capture response from the payment gateway. The commerce client module also drives a POS device to execute the device agnostic payment transaction operation in accordance with the payment request and the authorization and capture response.

15 Claims, 8 Drawing Sheets

(56) References Cited

U.S. PATENT DOCUMENTS

| | | | |
|---|---|---|---|
| 8,571,937 B2 | 10/2013 | Rose et al. | |
| 8,645,274 B2 * | 2/2014 | Hasson | H04W 4/14 |
| | | | 705/44 |
| 8,781,923 B2 * | 7/2014 | Pitroda | G06Q 20/3227 |
| | | | 705/30 |
| 9,195,982 B2 | 11/2015 | Orr et al. | |
| 9,501,773 B2 | 11/2016 | Dai | |
| 10,115,095 B2 * | 10/2018 | Modi | G06Q 20/027 |
| 10,235,667 B2 * | 3/2019 | Rezayee | G06Q 20/3823 |
| 10,269,003 B2 * | 4/2019 | Webb | G06Q 20/40 |
| 10,339,524 B2 * | 7/2019 | Plomske | G06Q 20/38215 |
| 10,417,639 B1 * | 9/2019 | Beatty | G06Q 20/102 |
| 10,432,673 B2 * | 10/2019 | Bansal | H04L 67/16 |
| 10,628,814 B2 * | 4/2020 | Hendrick | G07G 1/0009 |
| 10,825,007 B2 * | 11/2020 | Fisher | H04M 1/72445 |
| 10,846,358 B1 * | 11/2020 | Hedaoo | H04L 67/10 |
| 2013/0185202 A1 | 7/2013 | Goldthwaite et al. | |
| 2013/0346302 A1 | 12/2013 | Purves et al. | |
| 2014/0040144 A1 | 2/2014 | Plomske et al. | |
| 2014/0089120 A1 | 3/2014 | Desai et al. | |
| 2015/0046329 A1 | 2/2015 | Huxham et al. | |
| 2015/0073990 A1 * | 3/2015 | Aliprandi | G06Q 20/389 |
| | | | 705/44 |
| 2016/0026987 A1 | 1/2016 | Modi et al. | |
| 2016/0034872 A1 | 2/2016 | Hendrick et al. | |

OTHER PUBLICATIONS

Crowe et al., "Mobile Phone Technology: "Smarter" Than We Thought", Federal Reserve Bank of Boston, Nov. 16, 2012, 30 pages.

Gao et al., "P2P-Paid: A Peer-to-Peer Wireless Payment System", IEEE Computer Society, 2005, 11 pages.

International Search Report and Written Opinion dated May 11, 2020 re: Application No. PCT/US2020/16367, pp. 1-4, citing: US 2016/0034872 A1 and US 2014/0089120 A1.

* cited by examiner

POINT OF SALE CLIENT INTEGRATION PLATFORM

BACKGROUND

Vendors employ multi-device point of sale (POS) or point of purchase systems to process transactions. More particularly, multi-device POS or point of purchase systems utilize conventional middleware to support interactions between different sub-systems to process item, food, and/or service transactions by calculating an amount owed by customers and provide payment options.

For instance, the vendors may use various devices, such as weighing scales, barcode scanners, and cash registers, of a first sub-system to calculate the amount owed by customers. The vendors may also use a payment terminal of a second sub-system to provide the payment options. Additional sub-systems may also be used by vendors to provide inventory, accounting, and/or product tracking in support of the transactions by the first and second sub-systems. In turn, the conventional middleware is built on a per sub-system bases and utilized to enable the interactions between the different sub-systems.

Unfortunately, technical compatibility and integration problems are inherent when building and implementing any multi-device POS or point of purchase systems and conventional middleware therein.

SUMMARY

According to one or more embodiments, a POS client integration platform is provided. The POS client integration platform includes a POS client application and a commerce client module that, in combination, provide a device agnostic payment transaction operation. The commerce client module includes communication interfaces, each of which corresponds to a particular communication protocol. The commerce client module receives a payment request from the POS client application and directly communicates, via one of the communication protocols, an authorization and capture request with respect to the payment request to a payment gateway. Through the same communication protocol, the commerce client module receives an authorization and capture response from the payment gateway. The commerce client module also drives a POS device to execute the device agnostic payment transaction operation in accordance with the payment request and the authorization and capture response.

According to one or more embodiments, the above POS client integration platform can be implemented as a system, apparatus, method, and/or computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

The disclosure relates to a POS client integration platform comprising a POS client application and a commerce client module that, in combination, provide a device agnostic payment transaction operation. The device agnostic payment transaction operation is a mechanism for enabling different (e.g., independent and separate) systems that generally do not communicate or interact to be fully compatible and integrated without extensive on-board programming. Embodiments disclosed herein may include a system, apparatus, method, and/or computer program product for implementing the POS client integration platform (which herein may be referred to a system).

Figure 1:
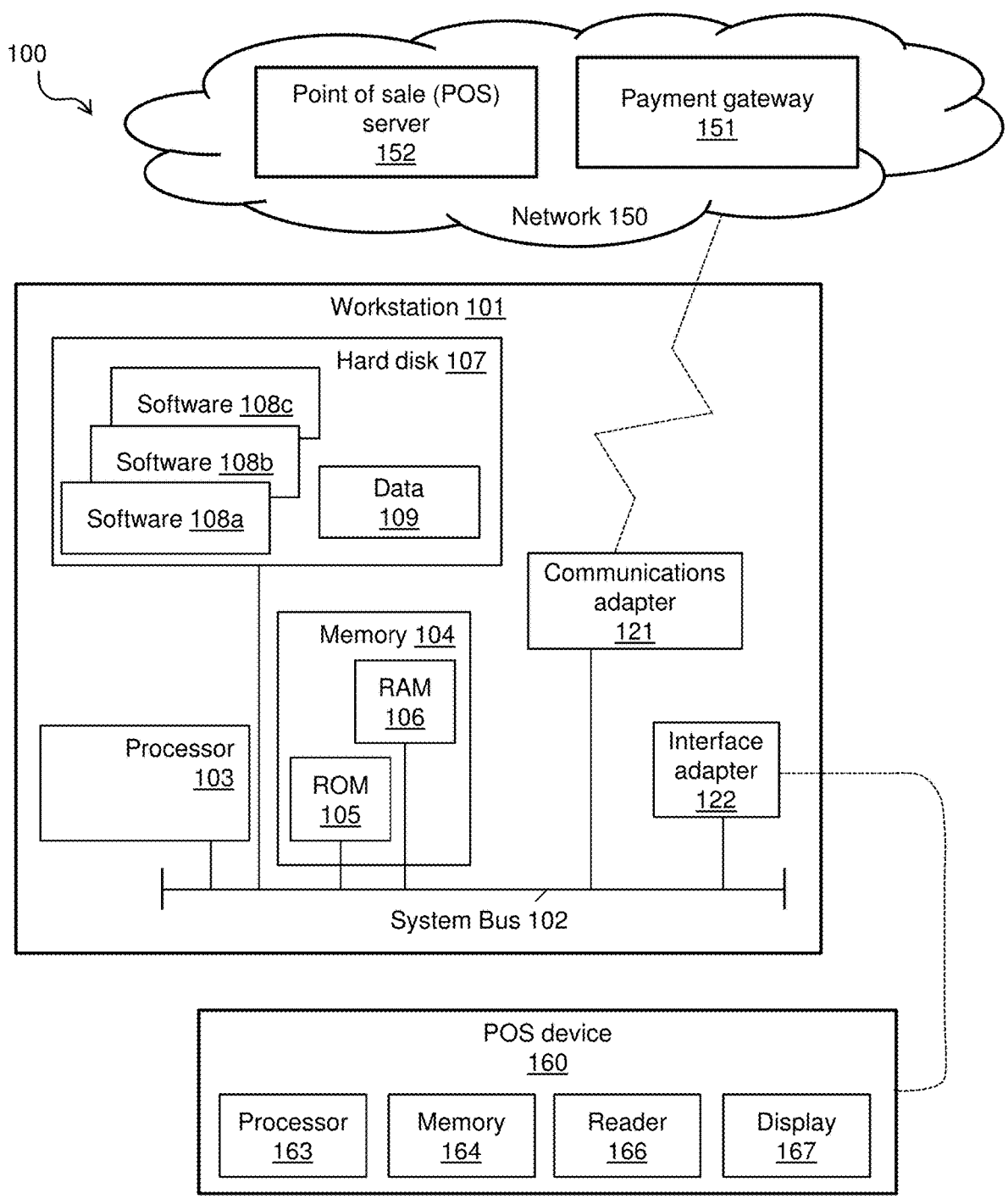
FIG. 1 depicts a system in accordance with one or more embodiments.

Turning now to FIG. 1, a system 100 for implementing the teachings herein is shown according to one or more embodiments. The system 100, in general, implements and manages payment transaction for items, food, and/or service whether or not a card is present for payment.

The system 100 has a workstation 101. The workstation 101 can be an electronic, computer framework including and/or employing any number and combination of computing devices and networks utilizing various communication technologies, as described herein. The workstation 101 can be scalable, extensible, and modular, with the ability to change to different services or reconfigure some features independently of others. Examples of the workstation 101 include, but are not limited to, a desktop computer, a laptop computer, a dedicated property management computer terminal, a point of sale computer, a tablet, and a smart phone. The workstation 101 includes a system bus 102 coupling a processor 103 to a memory 104 and various other components.

The processor 103 includes any processing hardware, software, or combination of hardware and software (utilized by the workstation 101) that carries out the computer readable program instructions by performing arithmetical, logical, and/or input/output operations. For instance, the processor 103, also referred to as a processing circuit, microprocessor, or computing unit, can include one or more central processing units. Examples of the processor 103 include, but are not limited to, an arithmetic logic unit, which performs arithmetic and logical operations; a control unit, which extracts, decodes, and executes instructions from a memory; and an array unit, which utilizes multiple parallel computing elements.

The memory 104 is an example of a tangible device (e.g., a computer readable storage medium) that retains and stores computer readable program instructions (such as a computer program product) for use by the processor 103 to carry out the operations of embodiments herein. The computer readable storage medium may be, for example, but is not limited to, an electronic storage device, a magnetic storage device, an optical storage device, an electromagnetic storage device, a semiconductor storage device, or any suitable combination of thereof. The computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The memory 104 can also include a variety of computer system readable media. Such media may be any available media that is accessible, and such media includes both volatile and non-volatile media, removable and non-removable media. As shown in FIG. 1, the memory 104 includes read only memory (ROM) 105 and random access memory (RAM) 106. The ROM 105 is coupled to the system bus 102 and may include a basic input/output system (BIOS), which controls certain basic functions of the system 100. The RAM 106 is read-write memory coupled to the system bus 102 for use by the processor 103. The workstation 101 also includes a hard disk 107, which is another example of a tangible device (e.g., a computer readable storage medium) that retains and stores computer readable program instructions executable by the processor 103. A non-exhaustive list of more specific examples of the computer readable storage medium (i.e., the memory 104) includes: a portable computer diskette, an erasable programmable read-only memory (EPROM or Flash memory), a static random access memory (SRAM), a portable compact disc read-only memory (CD-ROM), a digital versatile disk (DVD), a memory stick, and any suitable combination of thereof.

The hard disk 107 stores software 108a, 108b, and 108c (which may be generally referred to as software 108). The software 108 is stored as instructions for execution within the system 100 by the processor 103 (which correspondingly performs operations and/or processes, such as the process flow 300 depicted in FIG. 3), along with an operating system, one or more application programs, other program modules, and data 109. The data 109 includes a set of values of qualitative or quantitative variables organized in various data structures to support and be use by operations of the software 108. The software 108 may execute entirely on the workstation 101, partly on the workstation 101, as a stand-alone software package, partly on the workstation 101 and partly on a remote computer or server, or entirely on the remote computer or server. Thus, as configured in FIG. 1, the operations of the software 108 and the data 109 (e.g., which provide the device agnostic payment transaction operation) are necessarily rooted in the computational ability of the processor 103, the workstation 101, and/or components connected thereto to overcome and address the herein-described shortcomings of the conventional multi-device POS or point of purchase systems conventional middleware therein. In this regard, the software 108 and the data 109 replace conventional middleware and improve computational operations of the processor 103, the workstation 101, and/or components connected thereto, thereby reducing errors and compatibility concerns in conventional multi-device POS or point of purchase systems (thereby increasing efficiency of the system 100).

The system 100 of FIG. 1 includes one or more adapters (e.g., hard disk controllers, network adapters, graphics adapters, etc.) that interconnect and support communications between the processor 103, the memory 104, the hard disk 107, and other components of the system 100 (e.g., peripheral and external devices). In one or more embodiments, the one or more adapters can be connected to one or more I/O buses that are connected to the system bus 102 via an intermediate bus bridge, and the one or more I/O buses can utilize common protocols, such as the Peripheral Component Interconnect (PCI).

As shown, the workstation 101 includes a communications adapter 121 and an interface adapter 122. The communications adapter 121 interconnects the workstation 101 with a network 150 of the system 100 enabling the workstation to communicate with other systems, devices, data, and software, such as a payment gateway 151 and a POS server 152. The interface adapter 122 interconnects the workstation 101 with a POS device 160. The POS device 160 comprises a processor 163, a memory 164, a reader 166, and a display 167. The processor 163 and the memory 164 can be similar to the processor 103 and the memory 104 described herein. The payment gateway 151, the POS server 152, and/or the POS device 160 (like the workstation 101) can be an electronic, computer framework comprising and/or employing any number and combination of computing devices and networks utilizing various communication technologies, while being scalable, extensible, and modular.

The payment gateway 151, for instance, represents computer systems of a payment service provider and/or bank that authorizes direct debit or credit card payment transaction processing for businesses, retailers, vendors, service providers, etc. (whether online or brick and mortar).

The POS server 152 provides external processing power, data storage, networking, and graphical user interfaces to the system 100 for implementing the payment transaction and fulfilling the sale operations for purchasing items, services, etc.

The POS device 160 can be any payment terminal, POS terminal, credit card terminal, or the like.

Note that the payment gateway 151, the POS server 152, and the POS device 160 are different (e.g., independent and separate) systems that generally do not communicate or interact without the conventional middleware, which has inherent technical compatibility and integration problems that require extensive on-board programming to integrate all the systems and subsystems to facilitate payment operations. More particularly, each of the payment gateway 151, the POS server 152, and the POS device 160 can require a distinct communication protocol that is incompatible with a communication protocol of the other sub-system. In turn, the technical effect and benefits of the software 108 and the data 109 include providing the device agnostic payment transaction operation to improve computational operations of the processor 103, the workstation 101, the payment gateway 151, the POS server 152, and/or the POS device 160, thereby eliminating concerns of the conventional middleware.

In accordance with one or more embodiments, the workstation 101 may be connected to the payment gateway 151 and the POS server 152 through any type of network 150, including a local area network (LAN) or a wide area network (WAN), or the connection may be made to an external computer (for example, through the Internet using an Internet Service Provider). In one or more embodiments, the internal operations of the software 108 and the data 109 can be implemented on the network 150 to provide a platform as a service, a software as a service, and/or infrastructure as a service.

The reader 166 can be, for example, a device that interfaces with a payment card to make electronic funds transfers (e.g., via tap, insert, swipe, or manually card information entry actions). The display 167 can include any visual device for providing a user interface and may include, for example, a graphics controller to provide graphics performance (such as a display and management of a graphic user interface).

Figure 2:
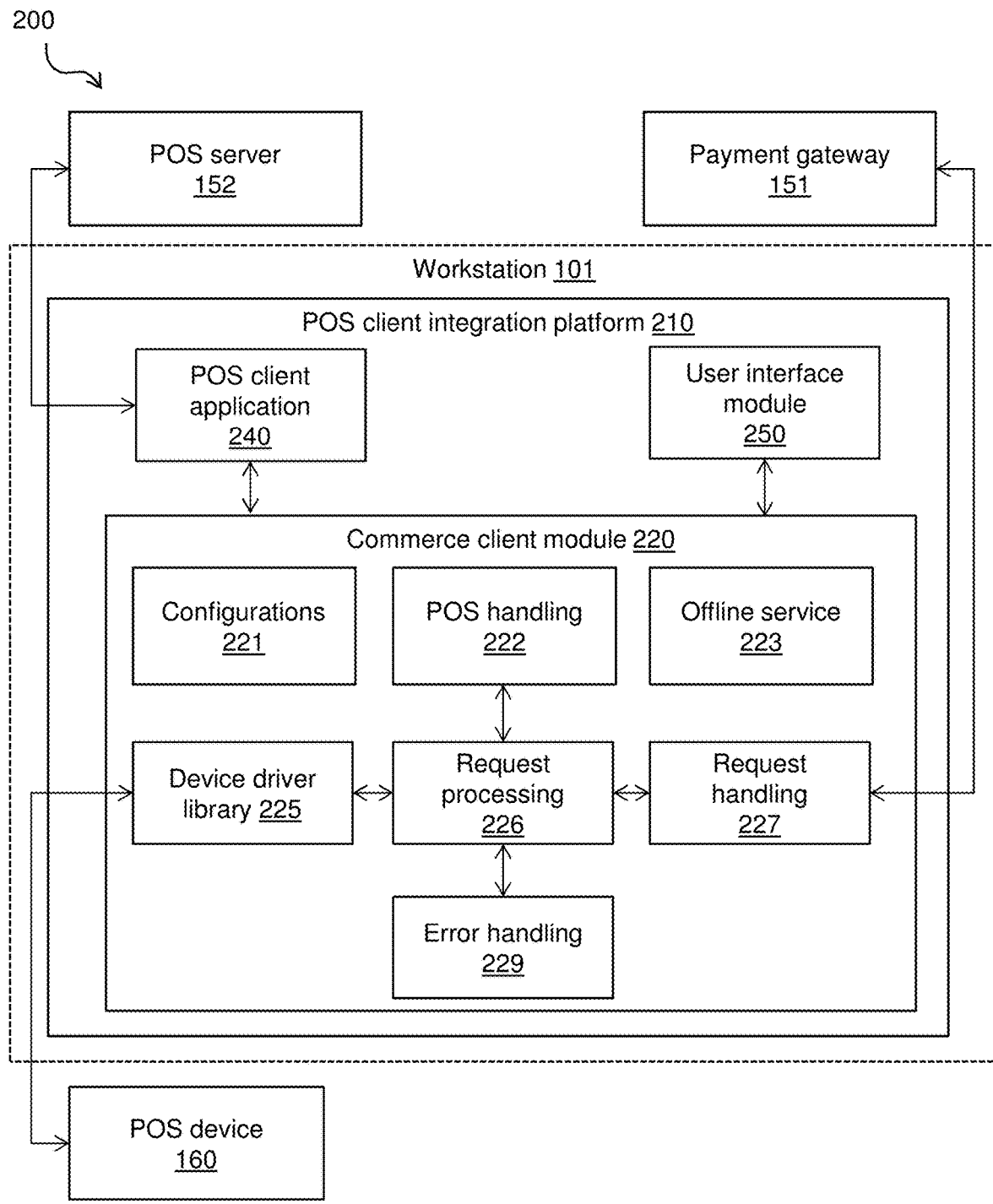
FIG. 2 depicts a POS client integration platform of a system in accordance with one or more embodiments.

Turning now to FIG. 2, a system 200 is shown in accordance with one or more embodiments. The system 200 includes the payment gateway 151, the POS server 152, and the POS device 160 of FIG. 1 (reused for brevity), each of which interacts with a POS client integration platform 210 (which is an example of the software 108 and the data 109 of FIG. 1).

As shown in FIG. 2, the POS client integration platform 210 includes a commerce client module 220 that communicates to the POS device 160 and drives a payment flow with card holder by executing, implementing, and/or utilizing configurations 221, POS handling 222, offline services 223, a device driver library 225, request processing 226, response handling 227, and error handling 229. The POS client integration platform 210 also includes a POS client application 240 and a user interface module 250. As the payment gateway 151, the POS server 152, and the POS device 160 are different systems, the POS client integration platform 210 (e.g., using the commerce client module 220 and the POS client application 240 in combination) provides the device agnostic payment transaction operation to improve computational operations of the workstation 101, the payment gateway 151, the POS server 152, and/or the POS device 160 to overcome the technical compatibility and integration problems of the conventional middleware.

In general, the commerce client module 220 utilizes the components therein to provide point-to-point encryption (P2PE) or end-to-end encryption (E2Ee) solutions with near field communication/radio frequency identification (NFC/RFID), dynamic currency conversion (DCC), and Euro pay, MasterCard, Visa (EMV), capabilities. The commerce client module 220 can be deployed on the workstation 101 and/or the POS server 152, depending upon POS and integration requirements (e.g., customer needs).

In accordance with a workstation integration, the commerce client module 220 enables any POS software of a vender (located on the POS server 152) to integrate to a P2PE or E2Ee solution, while removing a need to code and integrate software of the payment gateway 151. Specifically, the POS client application 240 can simply send a payment request and awaits a response, via multiple protocols, while the commerce client module 220 executes implements and manages payment transaction. In contrast, conventional middleware requires a first independent middleware program that distinctly talks to the POS software of a vender and a second independent middleware program that distinctly talks software of the payment gateway 151, with additional codding (likely independent nested programs) to enable the first and second middleware programs to talk to each other.

In accordance with one or more embodiments, the commerce client module 220 receives a POS requests to execute a card present or card not present payment transactions (which can include authentication, authentication/capture, refund, reversals, and card on file tokenization operations); communicates to the POS device 160 and the payment gateway 151; supports credit, debit, and/or RFID transaction; supports EMV transactions (which may require a pin and signature); receives requests for DCC checks; performs BIN file checks and updates; initiates prompts on POS device 160; initiates DCC requests to the payment gateway 151; processes pin debit transactions (e.g., swipe only, not EMV); processes digital signature captures; and performs automated device software installs/updates (including firmware, forms, images, videos, etc.).

The commerce client module 220 provides information to the user interface module 250, such as user interface configuration views, messages, error logs, transaction flows (including simulated device screen prompts for users to see what a card holder is seeing) related to the POS device 160. The commerce client module 220 further provides reset or restart services via the user interface module 250 for the POS device 160 and provides local DB storage for error logging and store and forward operations to support offline operations. The commerce client module 220 can also access a real-time data feed to a merchant's web service and make direct call to systems to get exchange rates. The commerce client module 220 can also automatically handle connecting and initializing the POS device 160, as well as registering the POS device 160 in the remote device management portal used to manage all POS devices across the merchant's estate.

The configurations 221 can include one or more communication interfaces and one or more communication protocols, each of which corresponds to one of the communication interfaces. Examples of the one or more communication protocols include extensible markup language (XML), international standards for laboratories (ISL)/Micros pay, name value pair, native Oracle opera, Oracle OPI, and the like.

The POS handling 222 represents one or more code operations that can receive and process payment requests from and send responses to the POS client application 240. For instance, the POS handling 222 automatically detects the protocol being used by the POS client application 240 and translates the request to the internal processing request consumed by the request processing 226. When no debit or credit card data is required for the request, the request processing 226 sends the request to the request handler 227 to then communicate to the payment gateway 151.

The offline services 223 represent one or more code operations that can handle payment requests by the POS device 160 when no network connection is present (e.g., the connection between the workstation 101 and the network 150 of FIG. 1). For instance, the offline services 223 of the commerce client module 220 provide offline capabilities including a subsequent background process to send payment transactions to the payment gateway 151 once a connection to the network 150 of FIG. 1 is restored (e.g., store and forward operations).

For example, in offline situations (when the workstation 101 does not have a network connection to the payment gateway 151), a floor limit can be utilized to approve a payment request. The floor limit can be a monetary value under any currency (e.g., $10, $20, or $100) preset in the configuration 221. The floor limit can be set as a default or set in the context of a payment request by the POS client application 240. In the former case, the commerce client module 220 utilizes the default floor limit when there is no network connection to the payment gateway 151. In the latter case, any payment request from the POS client application 240 can include the floor limit when there is no network connection to the payment gateway 151. In turn, if an amount of the payment request is less than ("<") or less than or equal to ("<=") the floor limit, the commerce client module 220 can send an approval message to the POS client application 240 with an approval code beginning with 'LA.' Each approved offline transaction is stored by the commerce client module 220 and can be processed in a batch once a network connection is stored. At the time of batch processing, the commerce client module 220 receives from the POS client application 240 a request to capture all authentications or approved offline transactions with 'LA'. The commerce client module 220, in response, performs an online authorization using the locally stored authentications.

For example, in another offline situation, the commerce client module 220 can approve a single payment transaction offline if the amount of the single payment transaction is less than ("<") or less than or equal to ("<=") a floor limit. Further, the commerce client module 220 can send an approval message to the POS client application 240 with an approval code beginning with 'LA.' The commerce client module 220 can write the single payment transaction to local storage. When connectivity is restored, the commerce client module 220 can re-process the single payment transaction.

The offline services 223 of the commerce client module 220 can forward offline reports of all successful and declined transactions that were stored and forwarded during the offline situation. Additionally, the offline services 223 of the commerce client module 220 can include an optional configuration file entry that enables, for X days, how many times the service should retry a declined transaction (e.g., declined due to a lack of network connection and the amount being about the floor limit). In other words, once back on line, any transaction declined due to the customer being over the floor limit can be queued and retried for X days until an approval or the X day is reached.

The device driver library 225 can include one or more drivers for identifying and communicating with any type of the POS device 160. In this regard, the device driver library 225 is utilized to quickly and efficiently identify the POS device 160 from one or more POS devices. The device driver library 225 is utilized to connect the commerce client module 220 to drive the POS device 160 without extensive on-board programming (to execute the device agnostic payment transaction operation in accordance with a payment request and an authorization and capture response). Further, the device driver library 225 can be utilized in conjunction with the configurations 221 to identify communication protocols of the POS device 160 and/or other components of the system 200. Based on the identified communication protocols, the commerce client module 220 translates communications to and from the POS device 160 and/or other components of the system 200 to support the device agnostic payment transaction operation.

The request processing 226 represents one or more code operations that can receive the translated request from the POS handling 222 operations and communicates to the device driver library 225 of what card data is required for the payment operations.

The request handling 227 represents one or more code operations that can send payment requests to and handles responses from the payment gateway 151, which it then communicates back to the POS device 160 via the device driver library 225. For instance, the request handling 227 represents one or more code operations that can directly communicate an authorization and capture request with respect to the payment request (from the POS client application 240) to the payment gateway 151. For instance, the request handling 227 represents one or more code operations that can directly receive an authorization and capture response from the payment gateway 151. Note that the authorization and capture response from the payment gateway 151 authorizes a payment for the payment request.

The error handling 229 represents one or more code operations of the commerce client module 220 that log errors and communication activity, without impacting the payment operations, for troubleshooting and informational purposes.

The POS client application 240 can make payment requests to the commerce client module 220. The payment requests can include, but is not limited to store identification, identification of the POS device 160, clerk identification, an amount, a payment type, etc. The payment request can be sent by the POS client application 240 to the commerce client module 220 in response to the POS client application 240 receiving a user input. The POS client application 240 can directly communicate messages from the commerce client module 220, respective to the device agnostic payment transaction operation, to a POS server 152.

The user interface module 250 provides cashier information on the activities and any messaging to/from the commerce client module 220 for user interaction. The user interface module 250 can be provided via a visual device connected to the workstation 101 (e.g., such as a display 167 of FIG. 1).

Figure 3:
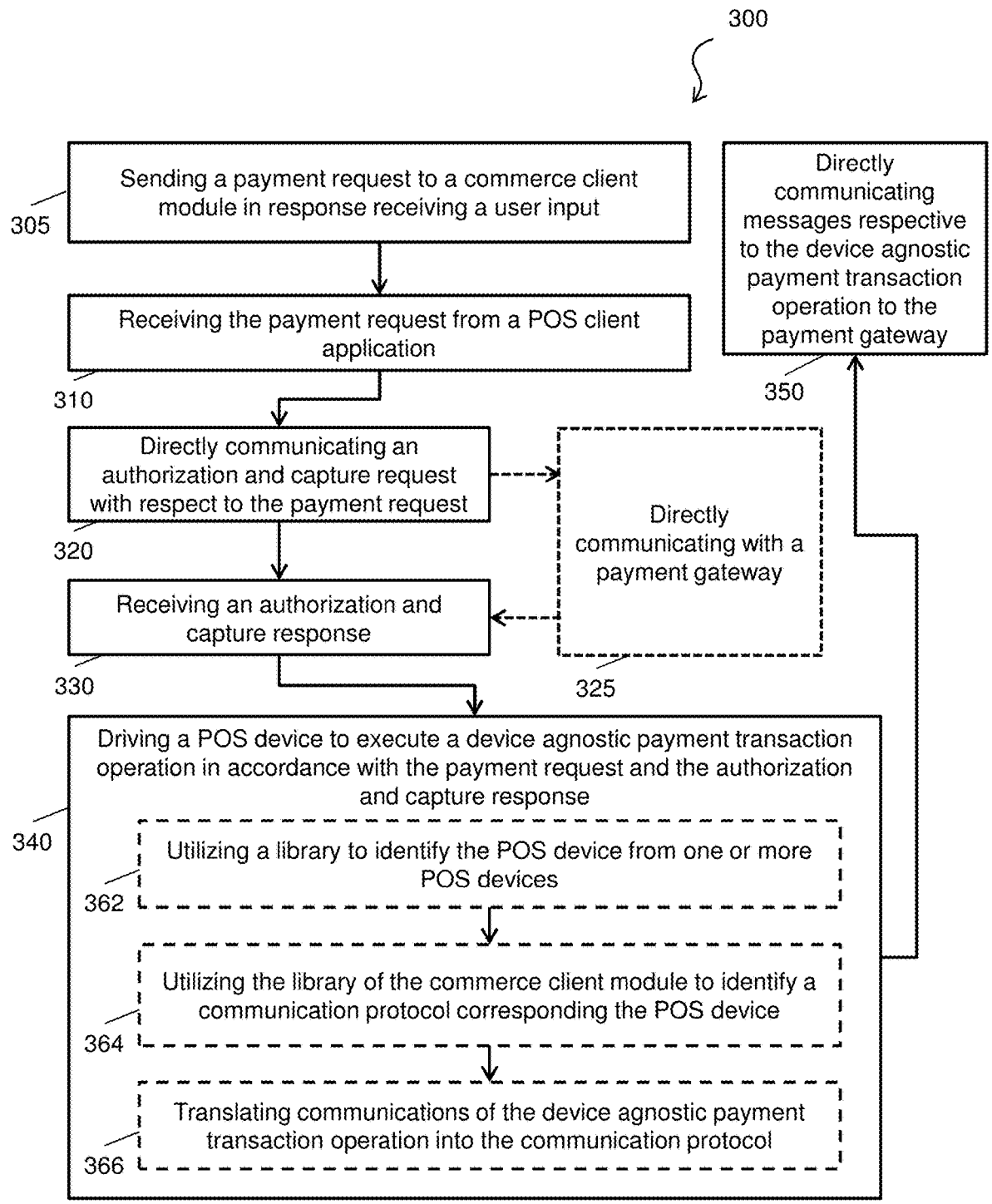
FIG. 3 depicts a process flow of a system in accordance with one or more embodiments.

Turning now to FIG. 3, a process flow 300 of a system in accordance with one or more embodiments. The process flow 300 is described with respect to the system 200 of FIG. 2. The process flow 300 is an example of a device agnostic payment transaction operation by the point of sale client integration platform 210. Note that the device agnostic payment transaction operation enables communication between the POS client application 240, the payment gateway 151, and the POS device 160.

The process flow 300 begins at block 305, where the POS client application 240 sends a payment request to the commerce client module 220 in response receiving a user input. At block 310, the commerce client module 220 receives the payment request from the POS client application 220. The payment request can be sent/received via any one of the multiple supported protocols. For instance, the communication between the POS client application 240 and the commerce client module 220 can be in accordance with a first supported protocol, whereby the POS handling 222 automatically detects the protocol and translates it (rather than using a configuration file).

At block 320, the commerce client module 220 communicates an authorization and capture request with respect to the payment request. The authorization and capture request can be directly communicated to the payment gateway 151, e.g., via the request handling 227 operation. At dotted-block 325, the payment gateway 151 receives the authorization and capture request, and the payment gateway 151 responds with an authorization and capture response. At block 330, the commerce client module 220 receives the authorization and capture response. The authorization and capture request and the authorization and capture response can be communicate via any one of the multiple supported protocols, such as a distinct second communication protocol stored in the configurations 221.

At block 340, the commerce client module 220 drives the POS device 160 to execute the device agnostic payment transaction operation. Driving the POS device 160 can be executed via any one of the multiple supported protocols, such as distinct third communication protocol stored in the configurations 221. At block 350, the POS client application 240 can directly communicate (via the second support protocol) messages respective to a status of the device agnostic payment transaction operation to the payment gateway 151.

In accordance with one or more embodiments, the operations of block 340 are further identified by sub-block 362, 364, and 366, identified by a dashed-line. At block 362, the commerce client module 220 utilizes a library (e.g., the device driver library 225) to identify the POS device 160 from one or more POS devices. At block 364, the commerce client module 220 utilizes the library to identify a communication protocol (e.g., distinct third communication protocol stored in the configurations 221) corresponding the POS device 160. At block 366, the commerce client module 220 translates communications of the device agnostic payment transaction operation into that communication protocol.

Operational schematics of the systems 100 and 200 are now described with respect to FIGS. 4-8.

Figure 4:
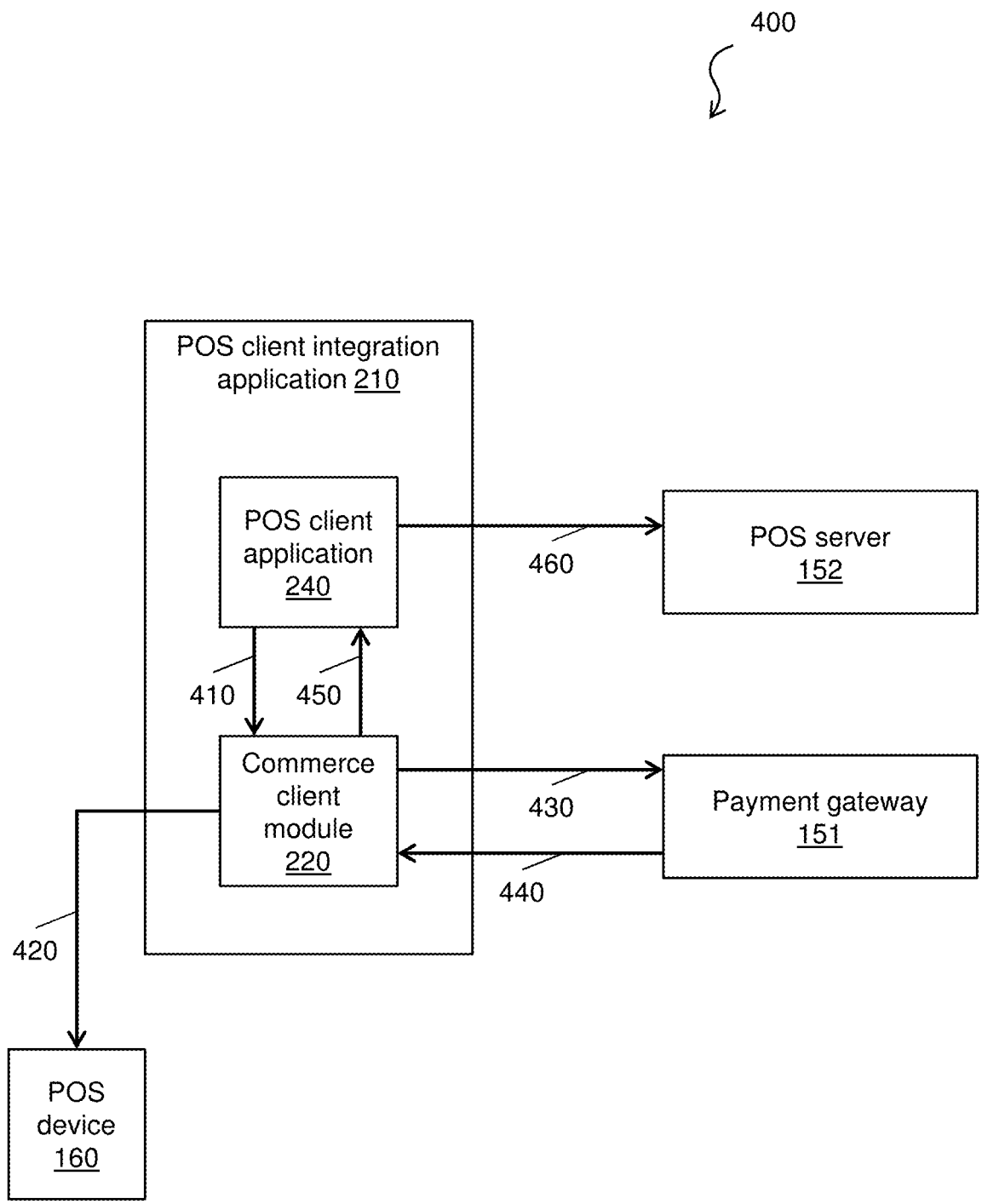
FIG. 4 depicts an operational schematic of a system in accordance with one or more embodiments.

FIG. 4 depicts an operational schematic 400 of a system (e.g., the systems 100 and 200 of FIGS. 1 and 2, respectively) in accordance with one or more embodiments. The operational schematic 400 is a retail implementation that includes the payment gateway 151, the POS server 152, and the POS device 160 of FIG. 1, along with the POS client integration application 210, the commerce client module 220, and the POS client application 240 of FIG. 2 (reused for brevity).

At operational arrow 410, the POS client application 240 sends a payment request to the commerce client module 220. At operational arrow 420, the commerce client module 220 activates the POS device 160 (note that this activation is executed across a communication protocol unique to the POS device 160 and stored within the commerce client module 220). At operational arrow 430, the commerce client module 220 makes a call to the payment gateway 151 (e.g., for payment). At operational arrow 440, the payment gateway 151 provides a response to the commerce client module 220 (e.g., an approved payment). At operational arrow 450, the commerce client module 220 sends a response to the POS client application 240. At operational arrow 460, the POS client application 240 communicates a payment request to the POS server 152, which updates according to the approved payment. Note that the communications between the POS client application 240 and the commerce client module 200 are unique or dissimilar to the communication protocol of the POS device 160.

Figure 5:
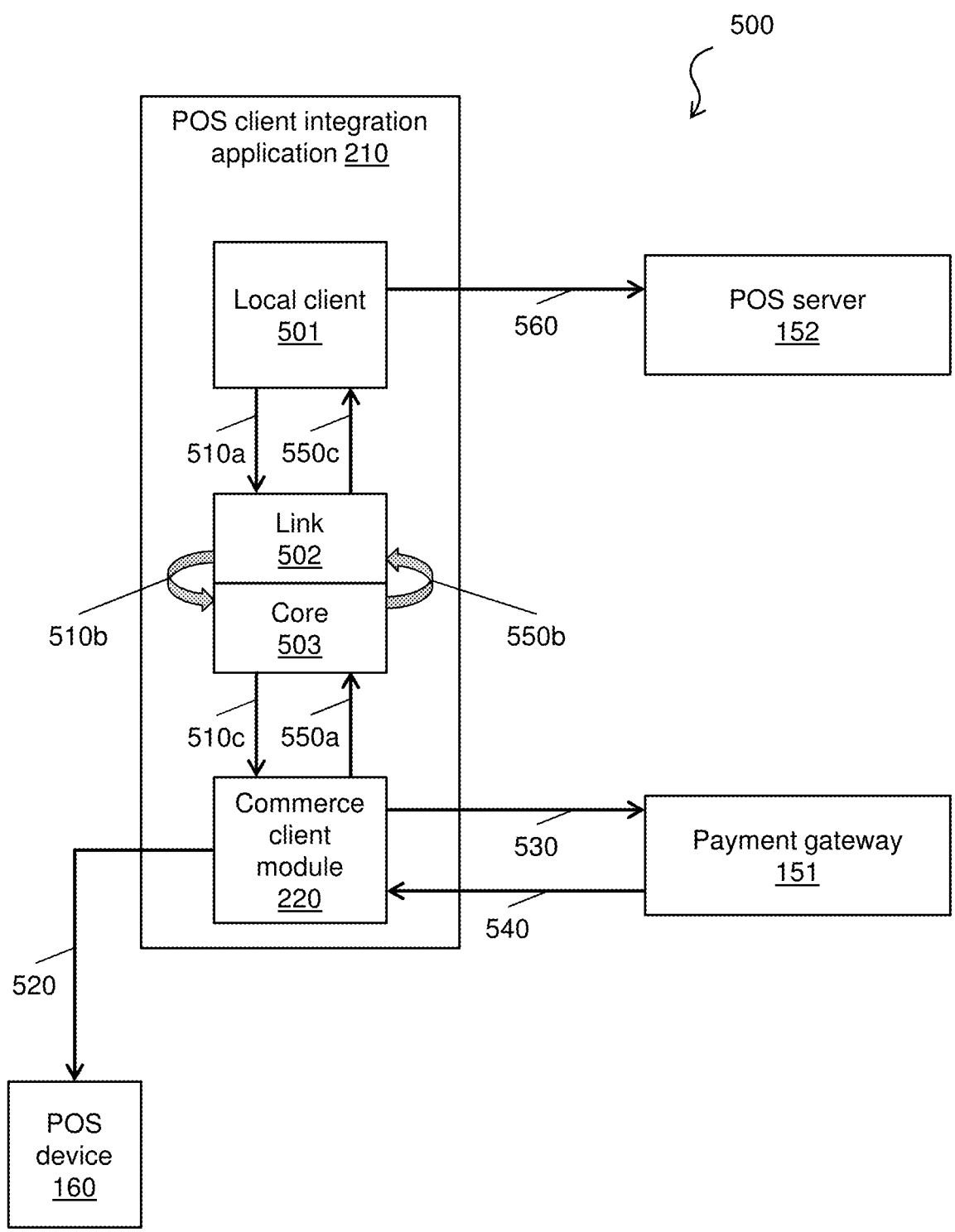
FIG. 5 depicts an operational schematic of a system in accordance with one or more embodiments.

FIG. 5 depicts an operational schematic 500 of a system (e.g., the systems 100 and 200 of FIGS. 1 and 2, respectively) in accordance with one or more embodiments. The operational schematic 500 is a store implementation that includes the payment gateway 151, the POS server 152, and the POS device 160 of FIG. 1, along with the POS client integration application 210 and the commerce client module 220 of FIG. 2 (reused for brevity). In addition, the operational schematic 500 includes a local client 501, a link 502 (e.g., Oracle EFT Link), and a core 503.

At operational arrow 510a, the local client 501 sends a payment request to the commerce client module 220. Before the payment request arrives, the link 502 communicates to the core 503 at operational arrow 510b, and then the core 503 communicates the translated request to the commerce client module 220 at operational arrow 510c. At operational arrow 520, the commerce client module 220 activates the POS device 160 (note that this activation is executed across a communication protocol unique to the POS device 160 and stored within the commerce client module 220).

At operational arrow 530, the commerce client module 220 makes a call with encrypted card data to the payment gateway 151 (e.g., for payment). At operational arrow 540, the payment gateway 151 provides a response to the commerce client module 220 (e.g., an approved payment). At operational arrow 550a, the commerce client module 220 sends a response to the POS client application 240. Before the payment request arrives, the core 503 communicates to the link 502 at operational arrow 550b, and then the link 502 communicates the translated response to the local client 501 at operational arrow 550c. At operational arrow 560, the local client 501 communicates a payment request to the POS server 152, which updates according to the approved payment.

Figure 6:
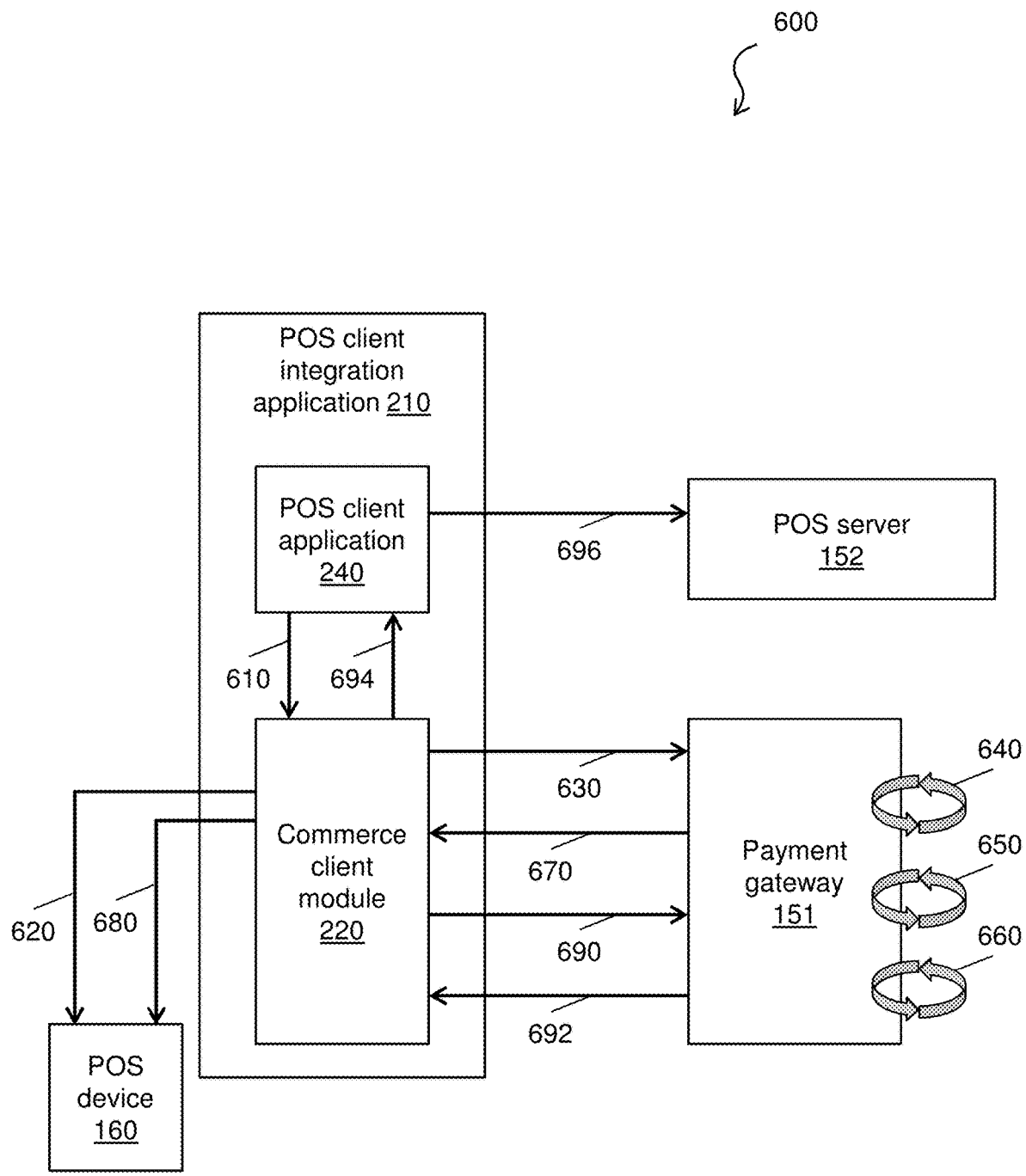
FIG. 6 depicts an operational schematic of a system in accordance with one or more embodiments.

FIG. 6 depicts an operational schematic 600 of a system (e.g., the systems 100 and 200 of FIGS. 1 and 2, respectively) in accordance with one or more embodiments. The operational schematic 600 is a dynamic software implementation that includes the payment gateway 151, the POS server 152, and the POS device 160 of FIG. 1, along with the POS client integration application 210, the commerce client module 220, and the POS client application 240 of FIG. 2 (reused for brevity).

At operational arrow 610, the POS client application 240 sends a payment request to the commerce client module 220. At operational arrow 620, the commerce client module 220 activates the POS device 160 (note that this activation is executed across a communication protocol unique to the POS device 160 and stored within the commerce client module 220).

At operational arrow 630, the commerce client module 220 initiates a key exchange with the payment gateway 151. The key exchange can include a key request with a processor injected serial number (e.g., a device identifier). At operational arrow 640, the payment gateway 151 adds a media identification code (MID) and a terminal identification code (TID) to the key request. At operational arrow 650, the payment gateway 151 provides the key request, the MID, and the TID to a processor or a server connected thereto (e.g., a bank system located behind the payment gateway 151). The processor or the server connected to the payment gateway 151 looks up keys, encrypts the keys, and computes a message authentication code (MAC). Optionally, the processor or the server connected to the payment gateway 151 compares the key request (and processor injected serial number therein), the MID, and the TID for fraud.

At operational arrow 670, the encrypted keys (with the computed MAC) are returned by the payment gateway 151 if everything is successful (e.g., the bank system did not experience an error), otherwise an error is returned. At operational arrow 680, the commerce client module 220 sends the keys to the POS device 160, where MAC is computed and compared to the computed MAC returned from the payment gateway 151. If the comparison is successful, the process flow 600 proceeds.

Note that some bank systems store the MID, the TID, and the processor injected serial number the first time the bank systems 'sees' a corresponding device in a 'get keys' request. In turn, as a fraud protection process, all future requests are compared to this relationship. If the processor injected serial number was transacted using a different MID and TID (e.g., it moved), the back system mark the corresponding device as potentially fraudulent and no further transactions are successful with that device.

At operational arrow 690, the commerce client module 220 makes a call to the payment gateway 151 (e.g., for payment). At operational arrow 692, the payment gateway 151 provides a response to the commerce client module 220 (e.g., an approved payment). At operational arrow 694, the commerce client module 220 sends a response to the POS client application 240. At operational arrow 696, the POS client application 240 communicates a payment request to the POS server 152, which updates according to the approved payment.

Figure 7:
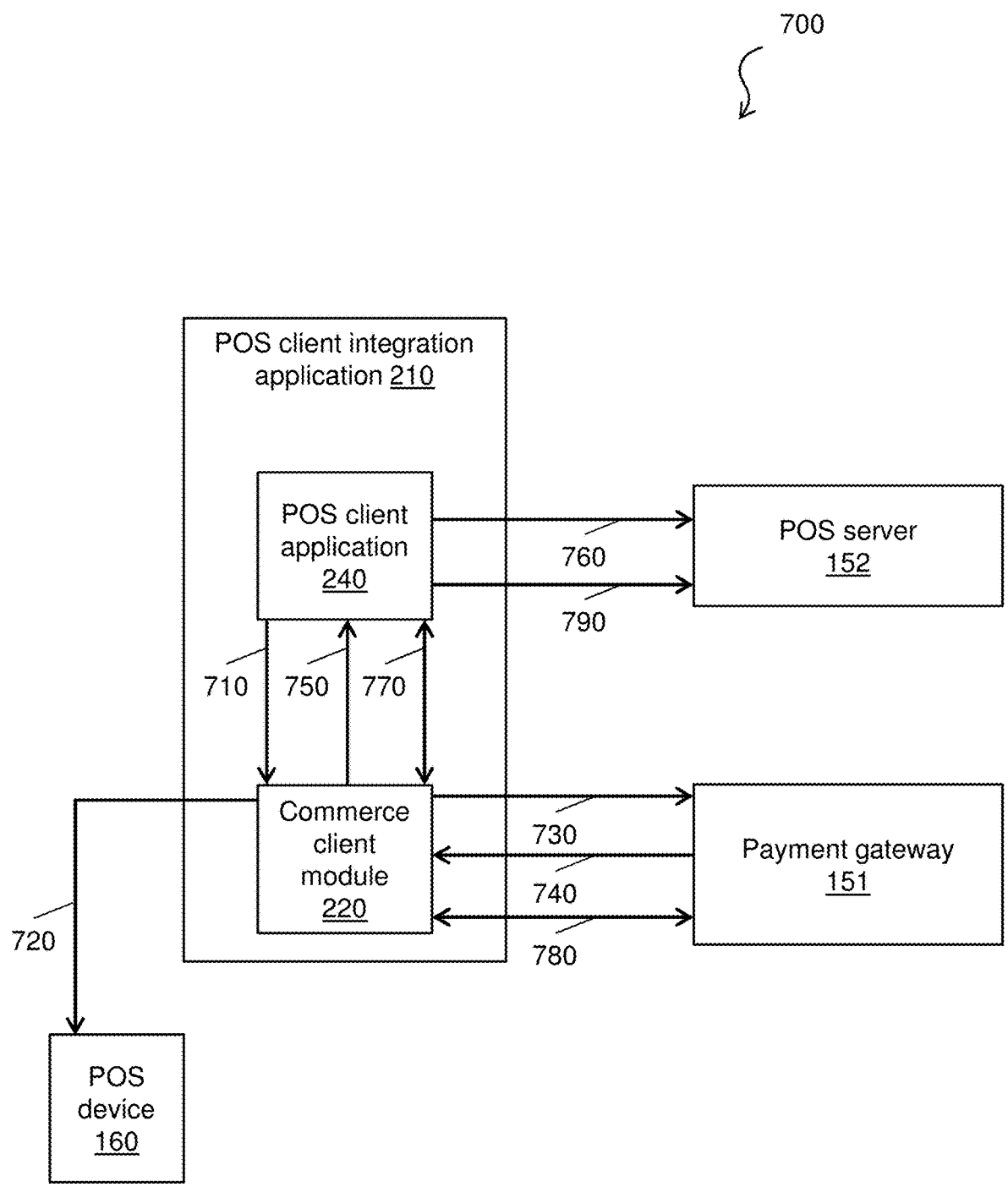
FIG. 7 depicts an operational schematic of a system in accordance with one or more embodiments.

FIG. 7 depicts an operational schematic 700 of a system (e.g., the systems 100 and 200 of FIGS. 1 and 2, respectively) in accordance with one or more embodiments. The operational schematic 700 is a split authentication and capture software implementation that includes the payment gateway 151, the POS server 152, and the POS device 160 of FIG. 1, along with the POS client integration application 210, the commerce client module 220, and the POS client application 240 of FIG. 2 (reused for brevity).

At operational arrow 710, the POS client application 240 sends a payment request to the commerce client module 220 (note that this activation is executed across a communication protocol unique to the POS device 160 and stored within the commerce client module 220). At operational arrow 720, the commerce client module 220 activates the POS device 160. At operational arrow 730, the commerce client module 220 makes a call to the payment gateway 151 (e.g., for payment). At operational arrow 740, the payment gateway 151 provides a response to the commerce client module 220 (e.g., an approved payment). At operational arrow 750, the commerce client module 220 sends a response to the POS client application 240. At operational arrow 760, the POS client application 240 communicates the response to the POS server 152.

At operational arrow 770, the POS client application 240 and the commerce client module 220 perform a capture. At operational arrow 780, the commerce client module 220 and the payment gateway 780 performs a capture request and response communication. At operational arrow 790, the POS client application 240 communicates another response to the POS server 152 with respect to the capture.

Figure 8:
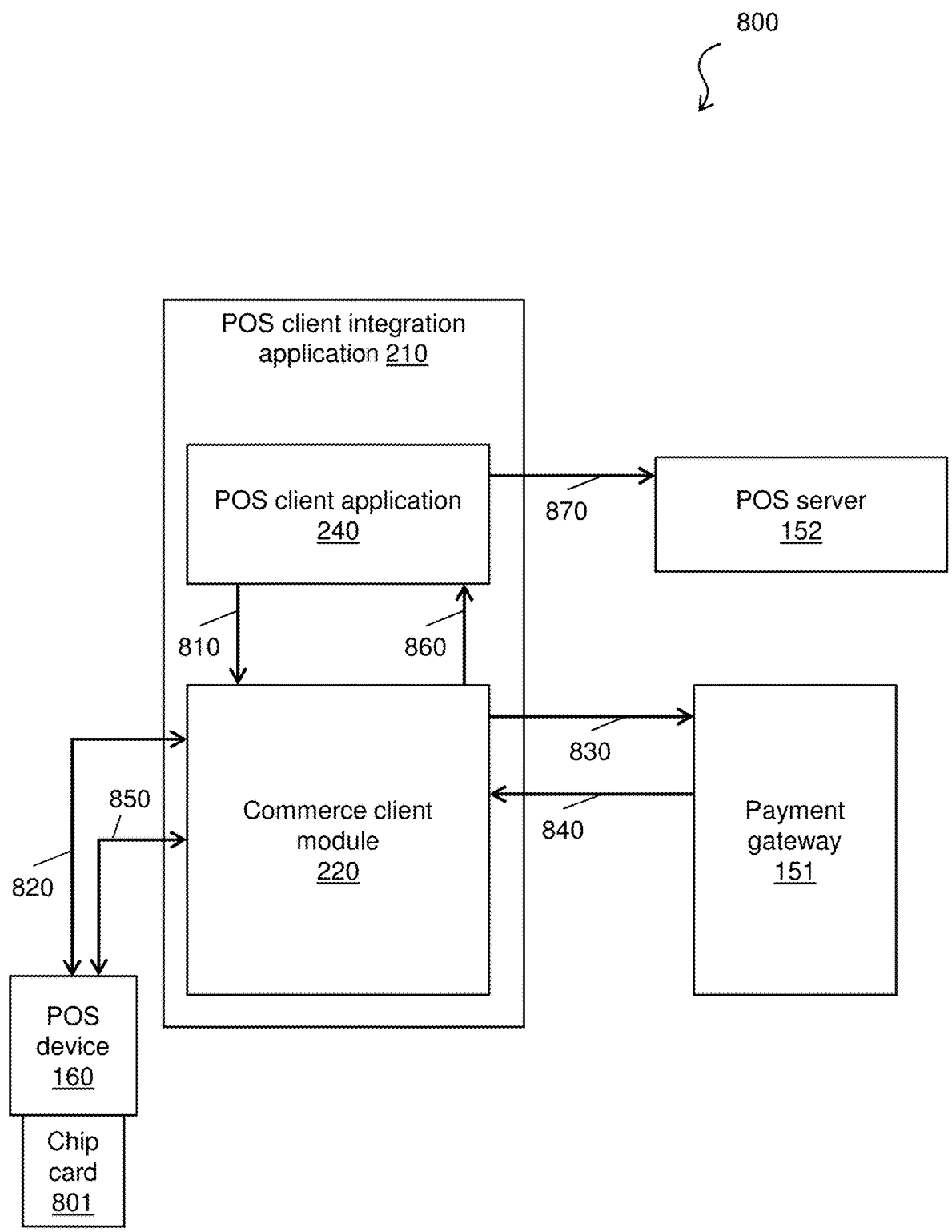
FIG. 8 depicts an operational schematic of a system in accordance with one or more embodiments.

FIG. 8 depicts an operational schematic 800 of a system (e.g., the systems 100 and 200 of FIGS. 1 and 2, respectively) in accordance with one or more embodiments. The operational schematic 800 is an EMV retail software implementation that includes the payment gateway 151, the POS server 152, and the POS device 160 of FIG. 1, along with the POS client integration application 210, the commerce client module 220, and the POS client application 240 of FIG. 2 (reused for brevity). In addition, the operational schematic 800 includes a chip card 801.

At operational arrow 810, the POS client application 240 sends a payment request to the commerce client module 220 (note that this activation is executed across a communication protocol unique to the POS device 160 and stored within the commerce client module 220). At operational arrow 820, the commerce client module 220 activates the POS device 160 to read the chip card 801 and returns the chip information. At operational arrow 830, the commerce client module 220 makes a call to the payment gateway 151. At operational arrow 840, the payment gateway 151 provides a response to the commerce client module 220.

At operational arrow 850, the commerce client module 220 communicates a response from the payment gateway 151 to the POS device 160 to write information back to the chip card 801, then returns the updated chip information. At operational arrow 860, the commerce client module 220 sends a response to the POS client application 240. At operational arrow 870, the POS client application 240 communicates the response to the POS server 152.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A point of sale (POS) client integration platform comprising a point of sale client application and a commerce client module that in combination provide a device agnostic payment transaction operation, the point of sale client integration platform being configured to:
receive, by the commerce client module comprising a plurality of communication interfaces, a payment request from the point of sale client application, each of the plurality of communication interfaces corresponding to one of a plurality of communication protocols;
directly communicate, by the commerce client module via a first communication protocol of the plurality of communication protocols, an authorization and capture request with respect to the payment request to a payment gateway;
receive, by the commerce client module via the first communication protocol, an authorization and capture response from the payment gateway; and
drive, by the commerce client module, a POS device to execute the device agnostic payment transaction operation in accordance with the payment request and the authorization and capture response, wherein the driving the POS comprises:
utilizing a library of the commerce client module to identify the POS device from one or more POS devices;
utilizing the library of the commerce client module to identify a second communication protocol of the plurality of communication protocols corresponding to the POS device; and translating communications of the device agnostic payment transaction operation into the second communication protocol.

2. The point of sale client integration platform of claim 1, wherein the authorization and capture response from the payment gateway authorizes a payment for the payment request.

3. The point of sale client integration platform of claim 1, wherein the point of sale client integration platform is configured to:
send, by the point of sale client application, the payment request to the commerce client module in response to the computer system receiving a user input.

4. The point of sale client integration platform of claim 1, wherein the point of sale client integration platform is configured to:
directly communicate, by the point of sale client application, messages respective to the device agnostic payment transaction operation to the payment gateway.

5. The point of sale client integration platform of claim 1, wherein the device agnostic payment transaction operation comprising card present or card not present payment transactions.

6. A method for providing a device agnostic payment transaction, the method comprising:
receiving, by a commerce client module comprising a plurality of communication interfaces, a payment request from a point of sale (POS) client application, each of the plurality of communication interfaces corresponding to one of a plurality of communication protocols;
directly communicating, by the commerce client module via a first communication protocol of the plurality of communication protocols, an authorization and capture request with respect to the payment request to a payment gateway;
receiving, by the commerce client module via the first communication protocol, an authorization and capture response from the payment gateway; and
driving, by the commerce client module, a POS device to execute the device agnostic payment transaction operation in accordance with the payment request and the authorization and capture response, wherein the driving the POS device comprises:
utilizing a library of the commerce client module to identify the POS device from one or more POS devices;
utilizing the library of the commerce client module to identify a second communication protocol of the plurality of communication protocols corresponding to the POS device; and
translating communications of the device agnostic payment transaction operation into the second communication protocol.

7. The method of claim 6, wherein the method further comprises:
sending, by the point of sale client application, the payment request to the commerce client module in response to the computer system receiving a user input.

8. The method of claim 6, wherein the method further comprises:
directly communicating, by the point of sale client application, messages respective to the device agnostic payment transaction operation to the payment gateway.

9. The method of claim 6, wherein the device agnostic payment transaction operation comprising card present or card not present payment transactions.

10. The method of claim 6, wherein the authorization and capture response from the payment gateway authorizes a payment for the payment request.

11. A computer system comprising a processor and a memory storing program instructions providing a point of sale (POS) client integration platform thereon, the point of sale client integration platform comprising a point of sale client application and a commerce client module that in combination provide a device agnostic payment transaction operation for the computer system, the program instructions being executable by the processor to cause the computer system to perform:
receiving, by the commerce client module comprising a plurality of communication interfaces, a payment request from the point of sale client application, each of the plurality of communication interfaces corresponding to one of a plurality of communication protocols;
directly communicating, by the commerce client module via a first communication protocol of the plurality of communication protocols, an authorization and capture request with respect to the payment request to a payment gateway;
receiving, by the commerce client module via the first communication protocol, an authorization and capture response from the payment gateway; and
driving, by the commerce client module, a POS device to execute the device agnostic payment transaction operation in accordance with the payment request and the authorization and capture response, wherein the driving the POS device comprises:
utilizing a library of the commerce client module to identify the POS device from one or more POS devices;
utilizing the library of the commerce client module to identify a second communication protocol of the plurality of communication protocols corresponding to the POS device; and
translating communications of the device agnostic payment transaction operation into the second communication protocol.

12. The computer system of claim 11, wherein the program instructions are further executable by the processor to cause the computer system to perform:
sending, by the point of sale client application, the payment request to the commerce client module in response to the computer system receiving a user input.

13. The computer system of claim 11, wherein the program instructions are further executable by the processor to cause the computer system to perform:
directly communicating, by the point of sale client application, messages respective to the device agnostic payment transaction operation to the payment gateway.

14. The computer system of claim 11, wherein the device agnostic payment transaction operation comprising card present or card not present payment transactions.

15. The computer system of claim 11, wherein the authorization and capture response from the payment gateway authorizes a payment for the payment request.

* * * * *